United States Patent [19]
Faulkner et al.

[11] 4,370,560
[45] Jan. 25, 1983

[54] COMPRESSOR LOAD CONTROL FOR AN AUXILIARY POWER UNIT

[75] Inventors: Dennis T. Faulkner; Timothy F. Glennon, both of Rockford; Albert L. Markunas, Roscoe, all of Ill.

[73] Assignee: Sundstrand Corporation, Rockford, Ill.

[21] Appl. No.: 242,058

[22] Filed: Mar. 9, 1981

Related U.S. Application Data

[63] Continuation of Ser. No. 85,121, Oct. 15, 1979, abandoned.

[51] Int. Cl.³ ............................................. H02P 9/04
[52] U.S. Cl. ................................. 290/40 C; 290/40 R
[58] Field of Search ............... 290/40 A, 40 B, 40 C, 290/40 F, 40 R; 244/53 R, 53 B; 60/39.16 R, 39.25

[56] References Cited

U.S. PATENT DOCUMENTS

| | | | |
|---|---|---|---|
| 3,104,524 | 9/1963 | Flanders | 60/39.16 R |
| 3,625,003 | 12/1971 | Liddle | 60/39.16 R |
| 3,678,285 | 7/1972 | Griffith | 290/40 |
| 3,686,860 | 8/1972 | White | 60/39.16 |
| 3,764,814 | 10/1973 | Griffith | 290/40 |

*Primary Examiner*—J. V. Truhe
*Assistant Examiner*—Shelley Wade
*Attorney, Agent, or Firm*—Wegner, McCord, Wood & Dalton

[57] ABSTRACT

An auxiliary power unit for an aircraft drives an electrical generator and an air compressor. The auxiliary power unit is primarily intended for operation with the aircraft on the ground when other aircraft power systems are shut down. The auxiliary power unit may, however, be used in an emergency to supplement the main aircraft generating system, with the aircraft airborne. When the auxiliary power unit generator is used in conjunction with the aircraft generating system, inlet air to the compressor is controlled to vary the compressor load on the power unit to minimize power unit speed changes and electrical frequency transients.

3 Claims, 7 Drawing Figures

COMPRESSOR LOAD CONTROL FOR AN AUXILIARY POWER UNIT

This is a continuation of application Ser. No. 85,121, filed Oct. 15, 1979, now abandoned.

This invention relates to a speed transient control for an aircraft auxiliary power unit.

An aircraft auxiliary power unit includes an engine which drives an electrical generator and an load air compressor. The auxiliary power unit is normally operated with the aircraft on the ground when other aircraft generators are shut down. It is sometimes necessary, however, that the auxiliary power unit generator be operated in conjunction with the main aircraft generating system. For example, if a main generator is inoperative and additional generating capacity is required for dispatch of the aircraft, the auxiliary power unit will be utilized. Most auxiliary power units do not have an altitude insensitive transient control such as a sophisticated constant speed drive system as commonly used with aircraft generating systems. When the auxiliary power unit generator is operated in conjunction with a main aircraft generator, it is necessary that the frequency of the auxiliary power unit generator be maintained within close limits to avoid causing frequency transients in the electrical system and malfunctions of equipment which depend on accurate supply frequency. Furthermore, the dynamics of the auxiliary power unit engine are such that transients due to speed excursions at higher altitudes cannot be directly controlled by varying fuel flow.

In accordance with the invention, transient control is provided by controlling the load on the auxiliary power unit engine from the load air compressor.

It is one feature of the invention that the control includes means for establishing a desired fuel flow to the engine, means for varying the compressor load and means responsive to the speed of the engine for controlling the compressor load.

Another feature of the invention is that the compressor has inlet vanes which are movable in position to modulate the air flow to the compressor and thus the load of the compressor on the engine.

A further feature is that the engine incorporates a gas turbine driven by the gas from a rotary gas producer or generator. The power unit control establishes the gas producer speed as a function of aircraft altitude.

Further features and advantages of the invention will readily be apparent from the following specification and from the drawings, in which.

Figure 1:
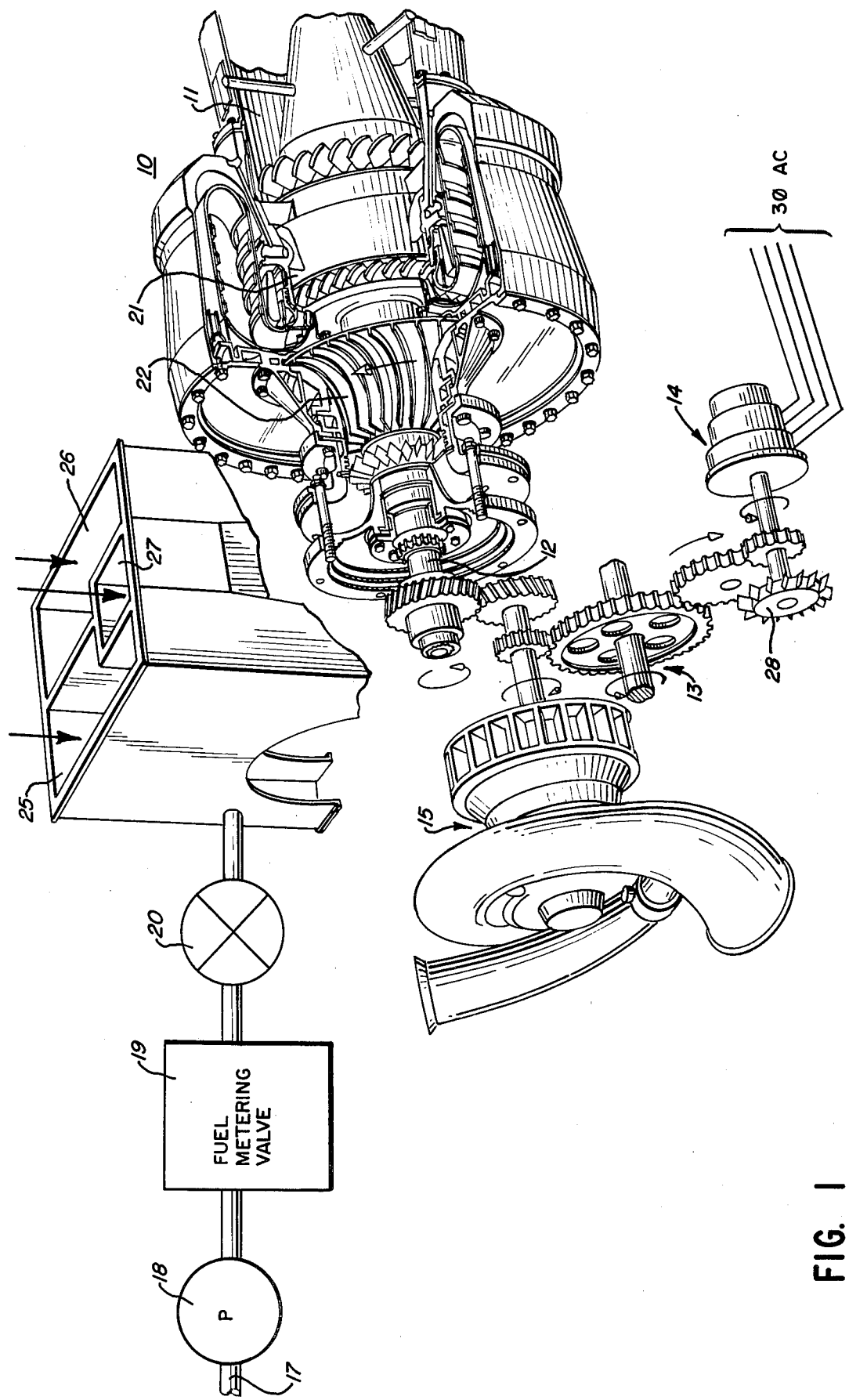
FIG. 1 is a diagrammatic perspective view of an auxiliary power unit with portions broken away for clarity.

Auxiliary power unit (APU) 10, FIG. 1, includes a turbine engine 11 which drives a shaft 12 that is connected through gearing 13 with an electrical generator 14 and a load air compressor 15. Turbine 11 uses aircraft jet fuel delivered from the aircraft fuel system through line 17 to a pump 18. The fuel passes through a fuel metering valve 19 and shutoff valve 20 to a rotary gas producer 21. Engine compressor 22 provides air which is mixed with the fuel and burned in gas producer 21 to generate the gas that drives power turbine 11.

Air inlet duct 25 directs air to load compressor 15. Duct 26 directs air to engine compressor 22. A third duct 27 directs air to fan 28 which circulates cooling air through the APU compartment of the aircraft.

The APU power turbine 11 drives the APU generator 14 and load compressor 15 to provide electric power and environmental air for the aircraft. If the mechanical load driven by the power turbine changes, the speed of the power turbine changes in response. Because the speed of the power turbine determines the frequency of the generator in the absence of a sophisticated constant speed drive, a change in the mechanical load driven by the power turbine will cause a corresponding change in the frequency of the generator. The APU power turbine speed is normally controlled by adjusting the fuel supply rate. However, if the load on the power turbine changes, the inertia of the system prevents a quick recovery of the power turbine from the change in loading. This long response time causes undesirable frequency transients in the output of the APU generator which may adversely affect those electrical components in the aircraft that depend upon accurate supply frequency.

To minimize transients and keep the system within its frequency tolerance limits, a load sharing control adjusts the load compressor inlet guide vane position to increase the mechanical load of the compressor on the power turbine. The fuel valve control supplies the gas producer with fuel at a rate sufficient to run the power turbine at the speed necessary to obtain the correct output frequency of the generator. The excess pneumatic load, which is dumped from the compressor surge control valve, is used as a cushion to absorb rapid changes in power turbine loading. Thereafter, if the loading on the power turbine changes, such as by a change in the electrical load on the generator, a control system adjusts the compressor inlet guide vanes to minimize short term transients while the fuel valve control is readjusted to maintain the desired steady-state speed.

Figure 2:
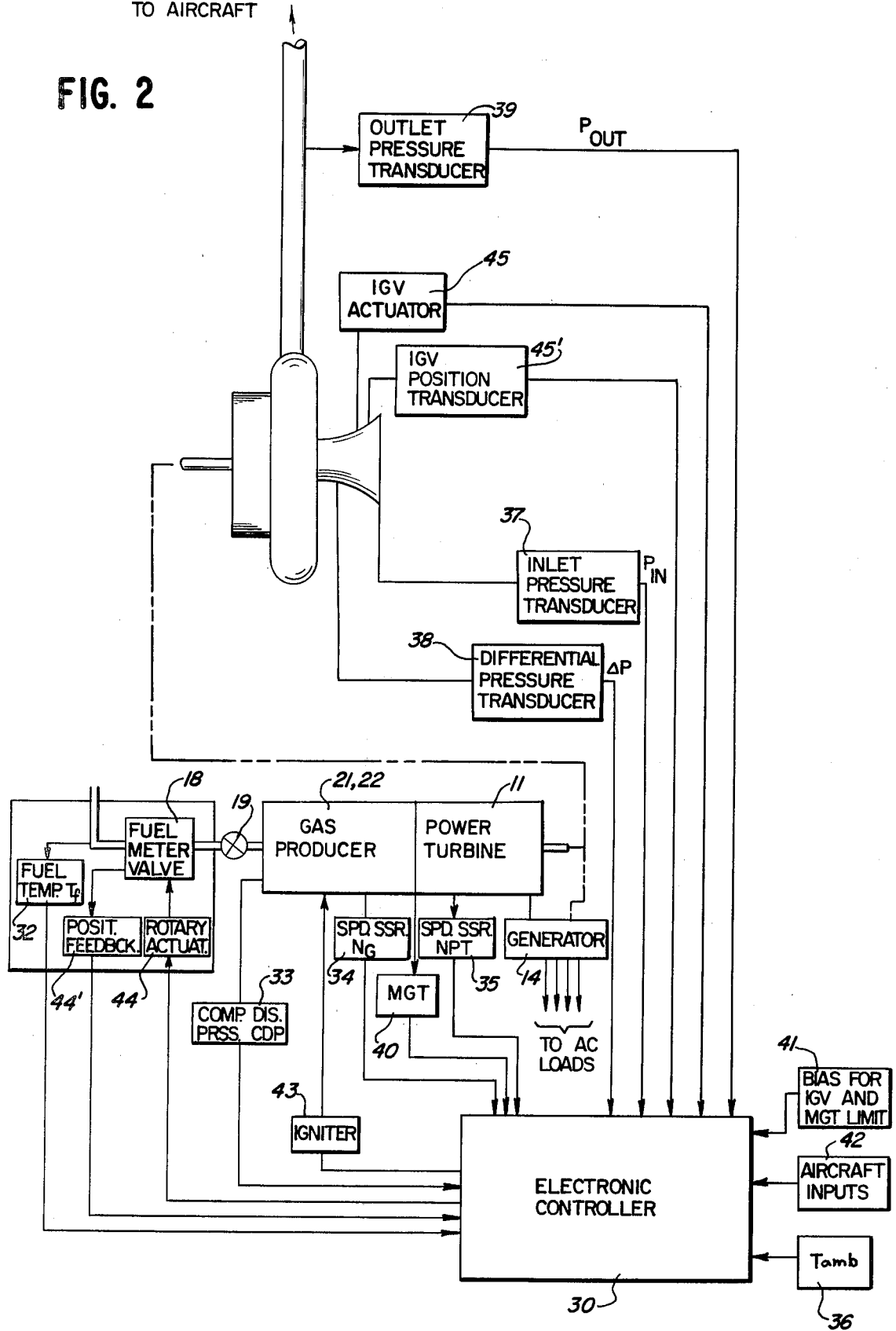
FIG. 2 is a diagrammatic block diagram of the auxiliary power unit, electronic controller and sensors and actuating elements related to the invention.

The auxiliary power unit utilizes an electronic controller 30 which is preferably a microprocessor. Inputs from sensors in the APU and from the aircraft provide information from which controller 30 develops control signals for APU actuator elements and appropriate condition displays in the aircraft. Only those portions of the control which are directly related to the present invention are illustrated in FIG. 2.

Inputs to controller 30 include:
32—incoming fuel temperature $T_f$
33—engine compressor discharge pressure CDP
34—gas producer speed $N_G$
35—power turbine speed $N_{pt}$
36—ambient temperature $T_{amb}$
37—load compressor inlet pressure $P_{IN}$
38—differential pressure in the load compressor $\Delta P$
39—load compressor outlet pressure $P_{OUT}$
40—measured temperature in the gas producer MGT 41—bias signals from the load compressor inlet guide vanes and the measured gas temperature limit 42—aircraft inputs including air/ground and the condition of the main aircraft generator Outputs from controller 30 are connected with actuator elements in the APU. These include:

43—the fuel igniter in gas producer 21, 22

44—an actuator for fuel metering valve 18 with a complementary position sensor 44' which completes a servo loop for the valve control 45—load compressor inlet guide vane actuator with complementary position feedback transducer 45'.

Figure 3:
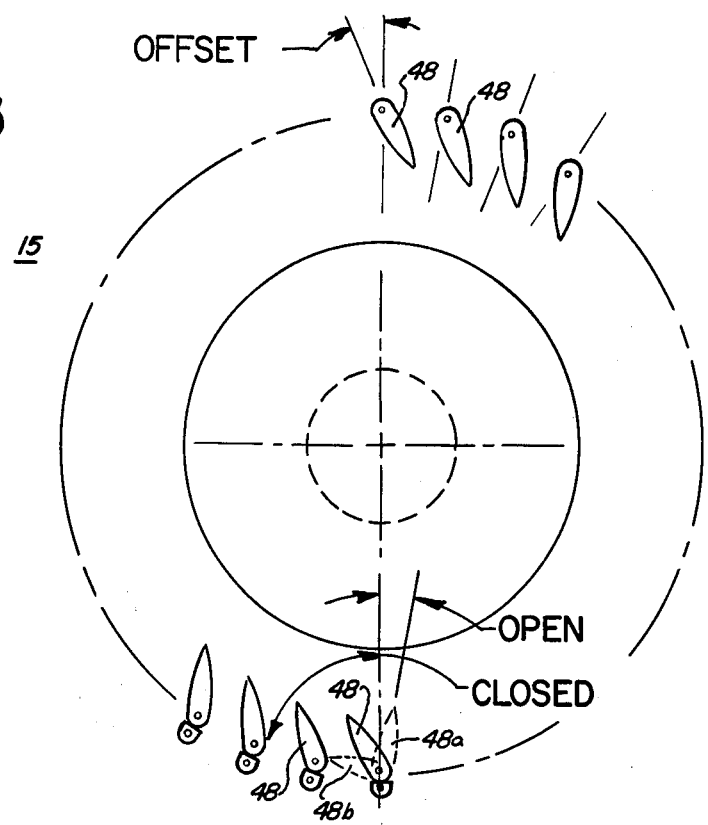
FIG. 3 is an end view of the compressor inlet guide vanes.
Figure 4:
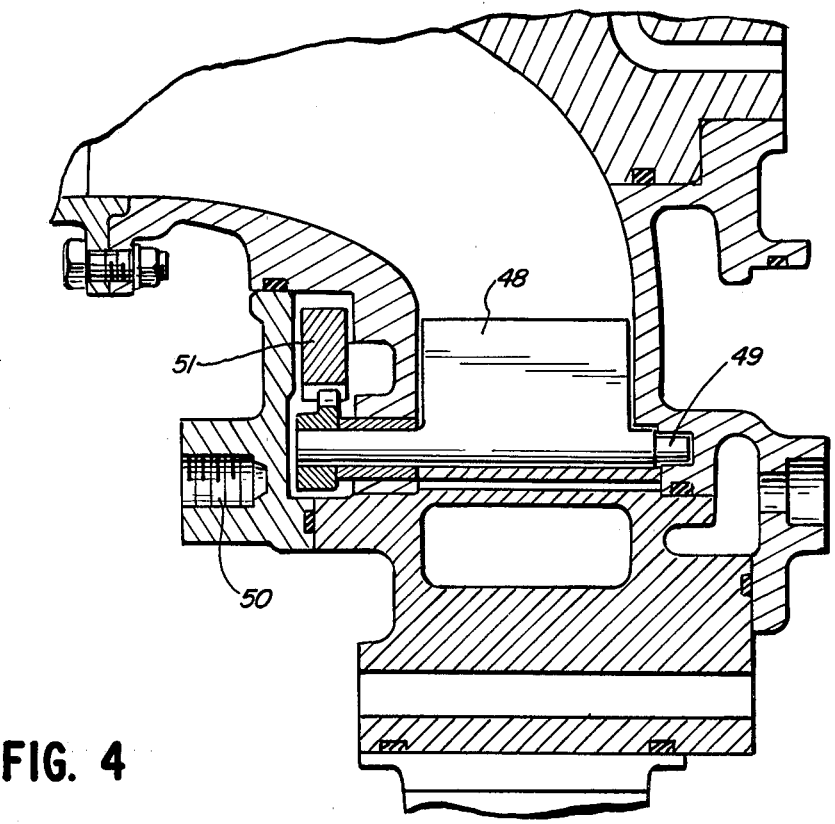
FIG. 4 is a fragmentary view of the load compressor showing an inlet guide vane in elevation.

The inlet guide vanes (IGV) 48 are illustrated diagrammatically in FIG. 3. A plurality of vanes are arranged around the load compressor inlet and are pivotally mounted for movement between the full open position 48a and full closed position 48b. As best seen in FIG. 4, each guide vane 48 is mounted on a pivot shaft 49. A pinion gear 50 engages a ring gear 51 driven by the inlet guide vane actuator to move all of the guide vanes to the desired position.

Figure 5:
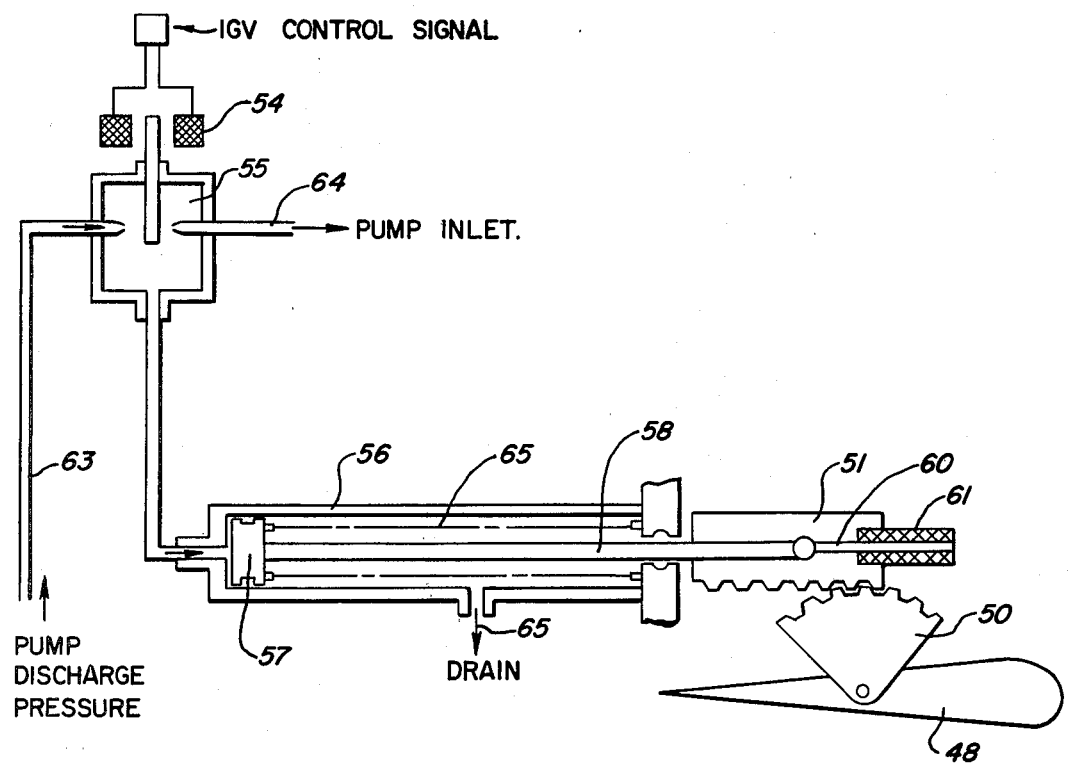
FIG. 5 is a diagrammatic view of the guide vane actuator.

The IGV control signal is connected with a torque motor 54, FIG. 5, which operates a servo valve 55, metering the flow of a hydraulic fluid to an actuator cylinder 56. Piston 57 has a rod 58 connected with ring gear 51. An extension 60 of piston rod 58 serves as a core of a differential transformer 61 providing an inlet guide vane position feedback signal to controller 30.

The hydraulic system preferably utilizes the fuel to the auxiliary power unit as an operating medium. Inlet line 63 is connected with the outlet of fuel pump 20 while servo valve outlet 64 and cylinder drain 65 are connected with the pump inlet. In cylinder 56, spring 65 urges piston 57 to its left hand position, corresponding to the closed position of inlet guide vane 48; hence, in the event of a failure of the hydraulic system, the guide vanes are closed.

Figure 6:
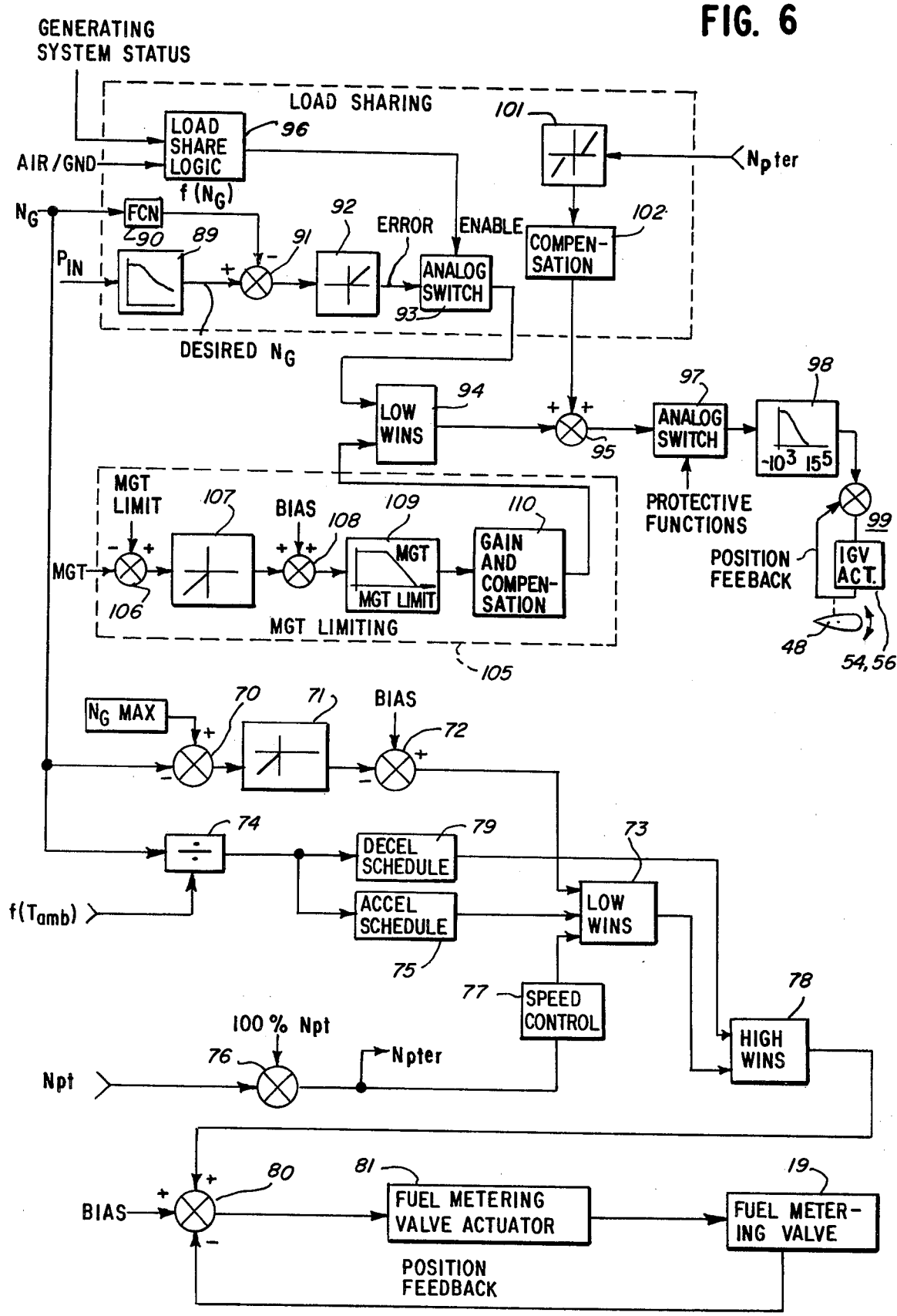
FIG. 6 is a simplified functional block diagram of that portion of the auxiliary power unit control related to establishing the fuel flow to the power unit engine and the compressor inlet guide vane position.

The APU speed control, illustrated in FIG. 6, is provided by circuits which compare the various system parameters and send an appropriate signal to a fuel metering valve actuator located in the fuel metering valve position control loop.

The actual gas producer speed $N_G$ is summed with the maximum gas producer speed $N_{G\ MAX}$ at summing junction 70. The resultant error signal is sent sequentially to a positive clipper 71, a bias circuit 72, and finally to a low wins circuit 73. This first input to low wins circuit 73 represents a gas producer speed limiting function.

Another input to low wind circuit 73 is derived by dividing $N_G$ by a function of the ambient temperature, $f(T_{amb})$, at block 74. The output of block 74 is sent to a signal generating block 75, the output of which represents the fuel flow in accordance with a desired acceleration schedule and is the second input to low wins circuit 73.

Another input to low wins circuit 73 is derived by summing at junction 76 the actual power turbine speed signal, $N_{pt}$, with a signal representing maximum power turbine speed, or 100% $N_{pt}$, to obtain a power turbine speed error signal. This signal is modified by the speed control block 77, the output of which is representative of power turbine speed control and which forms the third input to the low wins circuit 73.

The three inputs to block 73 are compared and the lowest valued signal is sent to a high wins circuit 78. The other input to block 78 is the output of block 79, which represents the deceleration schedule for fuel flow. The higher valued of the two signals is sent to summing junction 80 which is part of the fuel metering valve position control loop. A bias signal and the metering valve position information are summed with the output of high wins circuit 78 at junction 80 and sent to the fuel metering valve actuator 81, which in turn controls the fuel metering valve 19 to adjust the fuel flow for accurate steady-state system speed.

Operation of the load sharing control is also illustrated by the functional block diagram of FIG. 6. The desired speed $N_G$ for gas producer 21, is selected by a scaling circuit 89 which has an input $P_{IN}$ and an output which represents the desired gas producer speed. $P_{IN}$, the inlet pressure of the load compressor, is a measure of the atmospheric pressure and thus of the aircraft altitude. Scaling circuit 89 determines from the air pressure the proper operating speed for the gas producer. The actual gas producer speed, corrected for other system conditions at block 90, and represented as $f(N_G)$ is summed with the desired gas producer speed at summing junction 91. The resulting error signal is connected with a rectifier circuit 92 which selects the polarity of error signal representing a condition where actual $N_G$ is less than desired $N_G$ of the gas producer. This signal is connected through an analog switch 93 and a low wins circuit 94 to be described below, to summing junction 95. Analog switch 93 selects load share operation and is enabled by load sharing logic 96 when the aircraft is airborne or when the aircraft is on the ground and the APU generator 14 is operating in conjunction with at least one main aircraft generator. The output of summing junction 95 is connected through analog switch 97 to a scaling circuit 98 and inlet guide vane position servo loop 99.

Transient speed control is based on the power turbine speed error, $N_{pter}$, derived at summing junction 76, and connected through a deadband circuit 101 and a compensation circuit 102 to summing junction 95. As explained above, the output of summing junction 95 controls the position of the load compressor inlet guide vanes. Deadband circuit 101 corresponds with the frequency tolerance range of generator 14 and avoids modulation of the inlet guide vane position for small speed variations.

In a typical auxiliary power unit, the power turbine speed will recover from load induced changes in a few seconds so that the modification of load compressor operation to accommodate electrical load transients does not last long enough to alter appreciably the operation of aircraft systems utilizing compressed air.

With large electrical and pneumatic loads on the APU, the measured gas temperature MGT may reach its limiting value. The circuit 105 and the low wins circuit 94 override the programmed gas producer speed if this occurs. The signal MGT is summed with the limiting bias signal $MGT_{LIMIT}$ at junction 106. Positive clipper 107 selects the negative polarity difference signal indicating an excessive temperature. This signal is combined with a bias signal at summing junction 108, scaled in a limiting circuit 109 and coupled through a further scaling and compensating circuit 110 to the low wins circuit 94. When the MGT limiting condition is reached, the control acts to close the load compressor inlet guide vanes, reducing the load on the APU.

Figure 7:
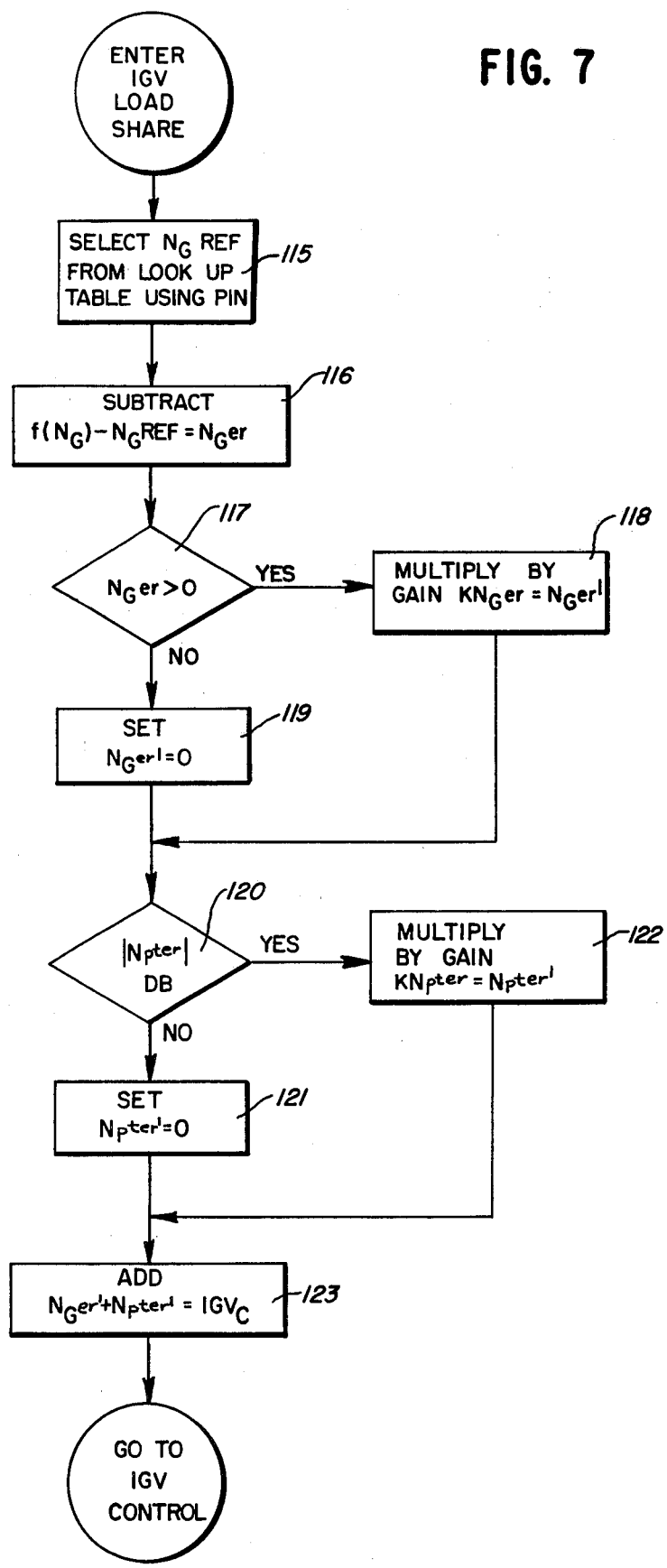
FIG. 7 is a flow chart for the guide vane control.

A flow chart for the load sharing mode of operation is given in FIG. 7. At block 115 load compressor inlet pressure $P_{IN}$ is utilized to select the reference or desired gas producer speed $N_G$REF. At block 116 a function of the actual gas producer speed $f(N_G)$ is summed with $N_GREF$ to provide an error signal $N_Ger$. At block 117 if $N_Ger$ is greater than zero, it is multiplied by a gain factor K at block 118. If it is not greater than zero, block 119 sets it equal to zero. At block 120 the absolute value of the power turbine speed error $N_{pt}er$ is established to determine whether it is greater than the deadband DB. If it is not, the speed error is set at zero in block 121. If the error is greater than the deadband, block 122 multiplies the error by the compensation factor of circuit 102. At block 123, the gas producer speed error is summed with the compensated power turbine speed signal to provide the inlet guide vane control signal $IGV_C$.

We claim:

1. In an aircraft auxiliary power unit, having an engine, a generator driven by the engine, an air compressor driven by the engine, the speeds of the engine, air compressor and generator being directly related,
 a fuel valve for the engine, and an engine control having means responsive to engine speed for controlling the fuel valve to maintain constant engine speed,
 an improved transient engine speed control, comprising:
 means for varying the loading of the air compressor on said engine; and
 means responsive to the speed of one of the engine, generator or compressor for varying the compressor loading simultaneously with control of said fuel valve to minimize variation of the speed of the output frequency of the generator.

2. The auxiliary power unit control of claim 1 for a power unit in which the engine is a turbine driven by gas from a rotary gas generator and in which the transient control includes:
 means responsive to aircraft altitude to establish a desired gas producer speed;
 means for measuring the actual gas producer speed;
 means for combining the desired gas producer speed and the actual gas producer speed to determine a gas producer speed error;
 said engine speed responsive means including means for combining engine speed with maximum engine speed to determine engine speed error; and
 means for adding said gas producer speed error and engine speed error to produce a composite error for varying compressor loading.

3. The auxiliary power unit of claim 1, in which the engine is a turbine and the transient control includes:
 means to establish a desired turbine speed;
 means for measuring the actual turbine speed;
 means combining the desired and actual turbine speed to establish a turbine speed error signal, said turbine speed error signal operative to control the fuel valve and to affect the positioning of the inlet guide vanes.

* * * * *